United States Patent
Little et al.

(10) Patent No.: US 6,529,659 B2
(45) Date of Patent: Mar. 4, 2003

(54) WAVEGUIDE TUNABLE BRAGG GRATING USING COMPLIANT MICROELECTROMECHANICAL SYSTEM (MEMS) TECHNOLOGY

(75) Inventors: Michael J. Little, Oak Park, CA (US); John Terry Bailey, Bell Canyon, CA (US)

(73) Assignee: Parvenu, Inc., Westlake Village, CA (US)

( * ) Notice: Subject to any disclaimer, the term of this patent is extended or adjusted under 35 U.S.C. 154(b) by 76 days.

(21) Appl. No.: 09/832,102

(22) Filed: Apr. 11, 2001

(65) Prior Publication Data

US 2002/0003925 A1 Jan. 10, 2002

Related U.S. Application Data

(60) Provisional application No. 60/201,263, filed on May 2, 2000.

(51) Int. Cl.[7] .................................................. G02B 6/34
(52) U.S. Cl. ........................................ 385/37; 359/160
(58) Field of Search .................. 385/24, 37, 8, 385/35, 140, 141, 142, 12, 16, 31, 39, 42–45, 127, 130; 359/160, 161, 177, 179, 341, 127, 124

(56) References Cited

U.S. PATENT DOCUMENTS

| | | | | |
|---|---|---|---|---|
| 5,699,468 A | * | 12/1997 | Farries et al. ................ | 385/140 |
| 5,982,963 A | * | 11/1999 | Feng et al. ................... | 359/188 |
| 6,108,470 A | * | 8/2000 | Jin et al. ....................... | 385/24 |
| 6,201,909 B1 | * | 3/2001 | Kewitsch et al. ............ | 359/124 |

OTHER PUBLICATIONS

"Fabrication of Distribution Electrostatic Micro Actuator (DEMA)" by K. Minami et al, Journal of Microelectromechanical Systems, vol. 2, No. 3 Dated Sep. 1993; pp. 121–127.*

Joost C. Lotters et al.; "Polydimethylisiloxane as an elastic material applied in a capacitive accelerometer"; (1996); J. Micromech. Microeng. 6 (1996) pp. 52–54.

P. Bley; "Polymers–an Excellent and Increasingly Used Material for Microsystems"; Sep. 1999; SPIE vol. 3876; pp. 172–184.

Thorbjorn Ebeforst et al.; "New small radius joints based on thermal shrinkage of polyimide in V–grooves for robust self–assembly 3D microstructures"; J. Micromech. Microeng. 8 (1998); pp. 188–194.

M Pedersent et al.; "A capacitive differential pressure sensor with polyimide diaphragm"; J. Micromech. Microeng. 7 (1997); pp. 250–252.

Frank Niklaus et al.; "Low–temperature full wafer adhesive bonding"; J. Micromech. Microeng. 11 (2001); pp. 100–107.

Kenji Suzuki et al.; "Insect–Model Based Microrobot with Elastic Hinges"; Journal of Microelectromechanical Systems, vol. 3, No. 1, Mar. 1994; pp. 4–9.

K. Minami et al.; "Fabrication of Distributed Electrostatic Micro Actuator (DEMA)"; Journal of Microelectromechanical Systems, vol. 2, No. 3, Sep. 1993; pp. 121–127.

(List continued on next page.)

*Primary Examiner*—Akm E. Ullah
(74) *Attorney, Agent, or Firm*—Fleshner & Kim, LLP

(57) ABSTRACT

A low cost waveguide tunable Bragg grating provides a flat passband and minimal crosstalk. A compliant material forms a waveguide that is imprinted with a Bragg grating and mounted on a MEMS actuator. Entropic materials such as elastomers, aerogels or other long-chain polymers may provide the necessary compliance. The application of a drive signal to the actuator deforms (squeezes or stretches) the compliant material thereby changing the Bragg spacing and shifting the resonant wavelength. The MEMS actuator can be an electrostatically or electromagnetically actuated comb-drive.

5 Claims, 3 Drawing Sheets

OTHER PUBLICATIONS

Cheol–Hyun Han et al.; "Parylene–Diaphragm Piezoelectric Acoustic Transducers"; The Thirteenth Annual International Conference on Microelectromechanical Systems; (2000), pp. 148–152.

Krzysztof A R B Pietraszewski et al.; "Cryogenic servo–stabilised Fabry–Perot Interferometer for imaging at 2–2.5microns"; SPIE Proceedings, vol. 2814 (1996); pp. 139–146.

T R Hicks et al.; "The application of capacitance micrometry to the control of Fabry–Perot etalons"; J. Phys. E. Instrum., vol. 17, 1984, pp. 49–55.

P. Tayebati et al.; "Widely Tunable Fabry–Perot filter Using Ga(Al)As–AlO$_x$ Deformable Mirrors"; IEEE Photonics Technology Letters, vol. 10, No. 3, Mar. 1998; pp. 394–396.

P. Tayebati et al.; "Microelectromechanical tunable filters with 0.47nm linewidth and 70nm tuning range"; Electronics Letters; Jan. 8, 1998; vol. 34, No. 1; pp. 76–78.

M.C. Larson et al.; "Vertical Coupled–Cavity Microinterferometer on GaAs with Deformable–Membrane Top Mirror"; IEEE Photonics Technology Letters, vol. 7, No. 4, Apr. 1995; pp. 382–384.

K. Aratani et al.; "Process and Design Considerations for Surface Micromachined Beams for a Tunable Interferometer Array in Silicon"; Proc. IEEE Micro Electro Mechanical Systems, Ft. Lauderdal, FL, 1993, pp. 230–235.

MEM–TUNE Tunable Filter; Preliminary Data Sheet; May 2000.

OPM–1 Optical Performance Monitor; Preliminary Data Sheet; May 2000.

GTM–1 EDFA Gain–Tilt Monitor; Preliminary Data Sheet; May 2000.

J. H. Jerman et al.; "Miniature Fabry–Perot Interferometers Micromachined in Silicon for use in Optical Fiber WDM Systems"; Transducers '91, International Solid–State Conference on Sensors and Actuators, pp. 372–375 (1991) IEEE, pp. 472–475.

P. Tayebati; "Microelectromechanical tunable filter with stable haft symmetric cavity"; Electronics Letters–IEEE, 1998, p. 1967.

* cited by examiner

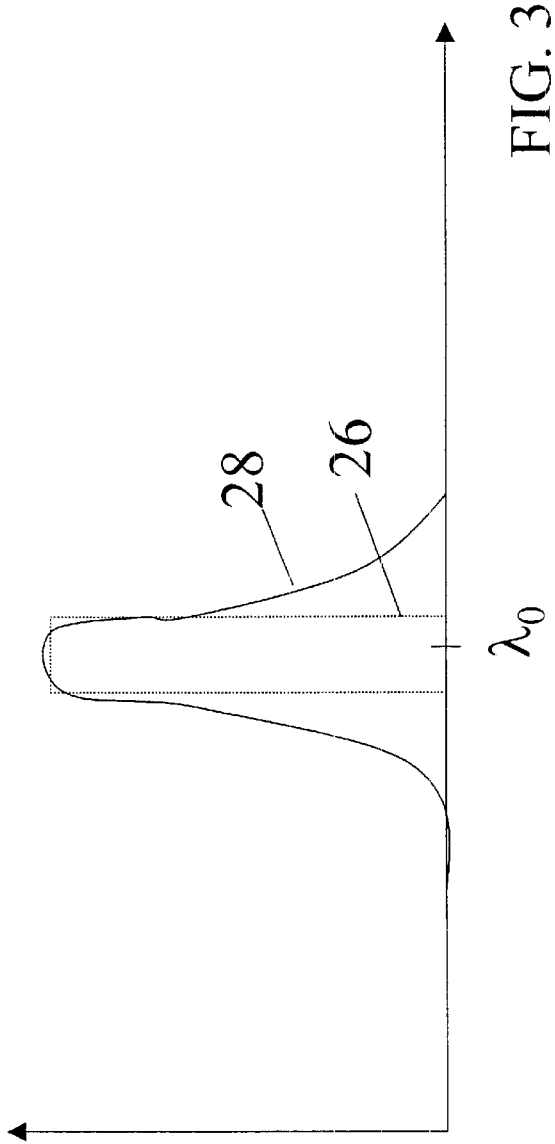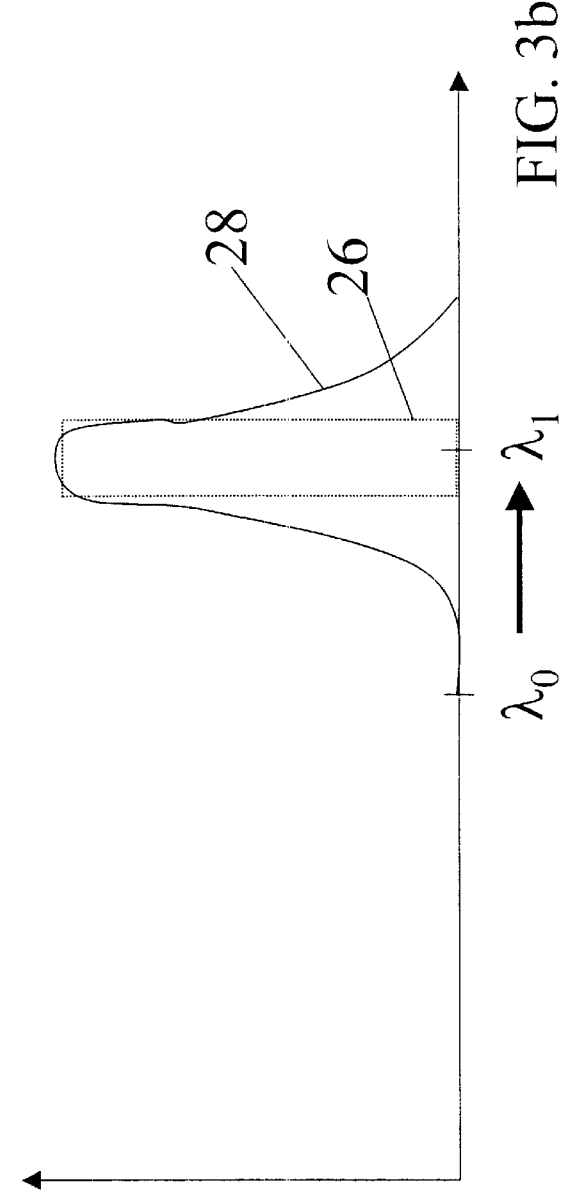

WAVEGUIDE TUNABLE BRAGG GRATING USING COMPLIANT MICROELECTROMECHANICAL SYSTEM (MEMS) TECHNOLOGY

RELATED APPLICATIONS

Priority is claimed based on U.S. Provisional Application No. 60/201,263 entitled "Waveguide Tunable Bragg Grating Using Compliant Microelectromechanical System (MEMS) Technology" filed May 2, 2000, which is hereby incorporated by reference in its entirety.

BACKGROUND OF THE INVENTION

1. Field of the Invention

This invention relates to optical spectral filters such as Bragg gratings and more specifically to a waveguide tunable Bragg grating that uses compliant MEMS technology.

2. Description of the Related Art

Bragg gratings transmit light at wavelengths in a predetermined passband and reflect the light at wavelengths that lie outside the passband back towards the source. A Bragg grating is a comparatively simple structure consisting of an arrangement of parallel semi-reflecting plates separated by a suitable transparent medium with a refractive index n at a Bragg spacing d. When the Bragg spacing between the reflecting surfaces is an integer number of half waves, the structure becomes optically resonant, with zero electric field intensity at the boundaries and energy coupled through the filter, ideally without loss. Other wavelengths not meeting the resonant condition are reflected. Although most all Bragg gratings are fixed, they are, in theory, tunable by controlling the refractive index n or Bragg spacing d.

The most common Bragg grating is a fiber Bragg grating (FBG) which consists of a fiber segment whose index of refraction varies periodically along its length. Variations of the refractive index constitute discontinuities that emulate a Bragg structure. A periodic variation of the refractive index is formed by exposing the germano-silicate core of the fiber to an intense ultra-violet (UV) optical interference pattern that has a periodicity equal to the periodicity of the grating to be formed. When the fiber is exposed to the intense UV pattern, structural defects are formed and thus a permanent variation of the refractive index having the same periodicity with the UV pattern. The FBG may be tuned by either applying a stretching force that elongates the fiber and thus changes it period (mechanical tuning) or applying heat to elongate the fiber and change its period (thermal tuning).

A similar Bragg grating reflector, based on a stacked-dielectric structure is composed of a quarter-wavelength thick layers, known as a photonic lattice, each with different refractive index. Photonic lattice reflectors have been found to reflect wavelengths over all possible angles of incidence and they do not absorb incident energy, as mirror-based reflectors do.

Bragg gratings are also used in semiconductor waveguides. The grating may be imprinted on the waveguide using a UV approach similar to the FBG or by masking a grating on top of the waveguide. The physical proximity of the grating to the waveguide causes variation of the effective refractive index that constitute discontinuities.

The Bragg grating is similar to the Fabry-Perot filter or etalon, which use a single pair of semireflecting plates. The additional complexity associated with a Bragg grating provides a more well defined passband. The etalon passband is characterized by a very sharp peak and a slow roll-off, which can introduce distortion in the wavelengths that are intended to be transmission and cause crosstalk between neighboring bands. The Bragg grating passband has a flat peak and a very fast roll-off such that the passband wavelengths are transmitted with minimal distortion and crosstalk is reduced.

SUMMARY OF THE INVENTION

In view of the above problems, the present invention provides a low cost waveguide tunable Bragg grating that provides a flat passband and minimal crosstalk.

This is accomplished by using a compliant material to form a waveguide that is imprinted with a Bragg grating and mounted on a MEMS actuator. Entropic materials such as elastomers, aerogels or other long-chain polymers may provide the necessary compliance. The application of a drive signal to the actuator deforms (squeezes or stretches) the compliant material thereby changing the Bragg spacing and shifting the resonant wavelength. For example, the MEMS actuator can be an electrostatically or electromagnetically actuated comb-drive.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a and 3b illustrate the grating's initial and shifted passband responses, respectively.

DETAILED DESCRIPTION OF THE INVENTION

Figure 1:
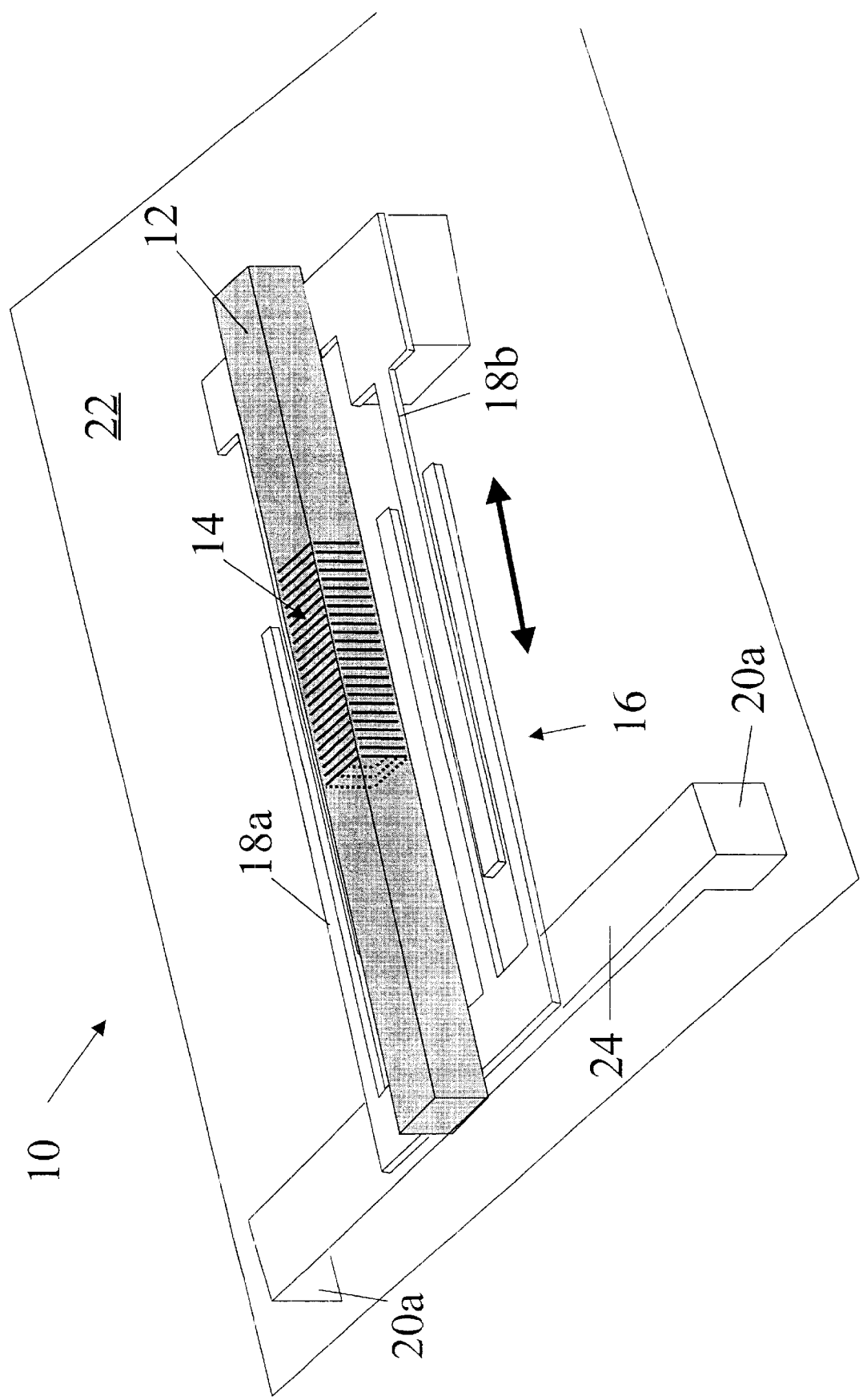
FIGS. 1 and 2 are perspective and top plan views, respectively, of a waveguide tunable Bragg grating in accordance with the present invention.
Figure 2:
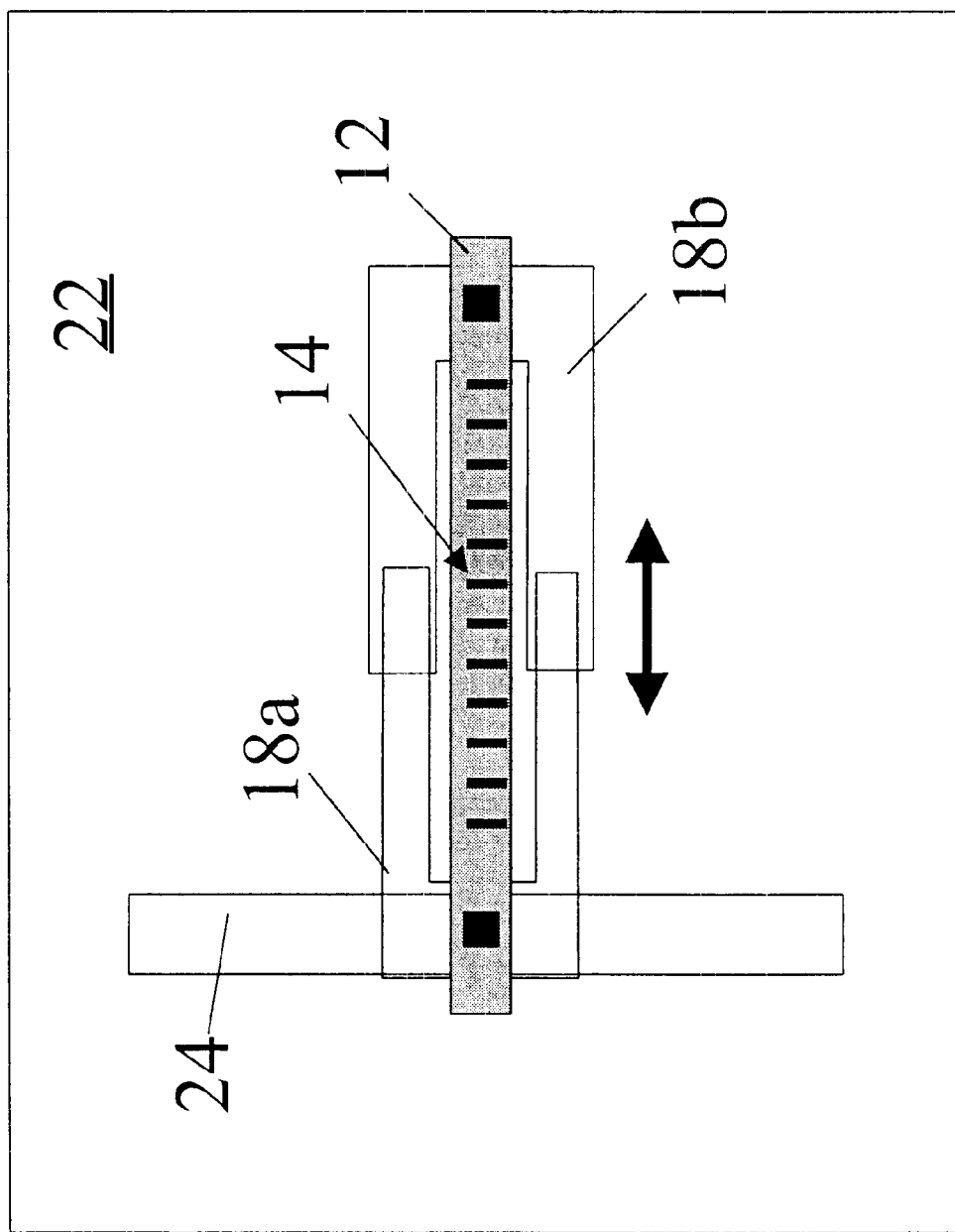

As shown in FIGS. 1 and 2, a waveguide tunable Bragg grating 10 includes a waveguide 12, which is imprinted with a Bragg grating 14 and mounted on a MEMS actuator depicted here as an electrostatically-actuated comb drive 16. Waveguide 12 is formed of a compliant material, suitably an entropic material such as elastomer, aerogel or other polymer. Bragg grating 14 is imprinted on the material using a process similar to the UV process for imprinting the fiber Bragg grating. Alternately, the grating may be imprinted using other standard techniques for forming Bragg gratings. Optical signals may be coupled to the waveguide using standard packaging techniques.

Comb drive 16 includes a pair of interdigitated fingers 18a and 18b that are mounted on pedestals 20a and 20b, respectively, on substrate 22. At least one of the pair of interdigitated fingers must be mounted to accommodate motion in order to compress waveguide 12. As depicted, fingers 18a are supported on a crossbeam 24 that is suspended above substrate 22 between a pair of pedestals 20a. The application of a voltage between the fingers produces an attractive force that pulls finger 18a closer to fingers 18b thereby compressing waveguide 12. Crossbeam 24 is configured such that its elastic restoring force, which works in opposition to the actuating force, is weak enough to allow motion yet sufficiently strong to return the waveguide to its original configuration when the voltage is removed.

Alternatively, the comb drive could be configured in such a manner as to stretch the waveguide. In this case, the waveguide would be fixed at one end and mounted on the movable fingers at the other end. The stationary fingers would be spaced apart from the movable fingers such that the application of a voltage would pull the movable fingers toward the stationary fingers thereby stretching the waveguide. In another embodiment, the comb drive could be configured in such a manner as to stretch or squeeze the waveguide by using a pair of opposing comb drives.

As shown in FIG. 3a, when no voltage is applied, the Bragg spacing is $d_0$ and the grating is tuned to a wavelength of $\lambda_0$ such that only light at that wavelength, or a narrow bandwidth centered at that wavelength, passes through the grating. The ideal passband 26 would have a perfectly rectangular shape, i.e. no distortion in the passband and zero crosstalk. The actual passband 28 should be fairly flat in the passband and roll-off to zero quickly to minimize crosstalk. As shown in FIG. 3b, the application of a voltage creates a force that compresses waveguide 12 reducing the Bragg spacing $d_i$. In this manner, the grating is tuned to select the desired center wavelength $\lambda_i$.

While several illustrative embodiments of the invention have been shown and described, numerous variations and alternate embodiments will occur to those skilled in the art. Such variations and alternate embodiments are contemplated, and can be made without departing from the spirit and scope of the invention.

We claim:

1. A waveguide tunable Bragg grating, comprising a waveguide which is formed from a compliant material imprinted with a Bragg grating having a Bragg spacing and mounted on a microelectromechanical system (MEMS) comb-drive actuator that deforms the compliant material in response to a drive signal thereby changing the Bragg spacing and shifting the waveguide's resonant wavelength;

wherein the comb-drive comprises a pair of interdigitated fingers that are mounted on a pair of pedestals, respectively, on a substrate, at least one of the interdigitated fingers being supported on a crossbeam suspended above the substrate to accommodate motion to deform the waveguide.

2. The waveguide tunable Bragg grating of claim 1 wherein the compliant material is an entropic material.

3. The waveguide tunable Bragg grating of claim 2 wherein the entropic material is an elastomer.

4. The waveguide tunable Bragg grating of claim 1, wherein the application of a voltage between the fingers produces an electrostatic-force that pulls the fingers supported on the crossbeam thereby deforming the waveguide.

5. A waveguide tunable Bragg grating, comprising:

a waveguide which is formed from an elastomer material and imprinted with a Bragg grating having a Bragg spacing;

an electrostatically-actuated comb-drive that supports the waveguide and deforms the elastomer material in response to a drive signal thereby changing the Bragg spacing and shifting the waveguide's resonant wavelength, wherein the comb-drive comprises a pair of interdigitated fingers that are mounted on a pair of pedestals, respectively, on a substrate, at least one of the interdigitated fingers being supported on a crossbeam suspended above the substrate to accommodate motion to deform the waveguide.

* * * * *